F. B. RICHARDSON.
SHAFT COUPLING.
APPLICATION FILED JAN. 9, 1908.
939,744.
Patented Nov. 9, 1909.
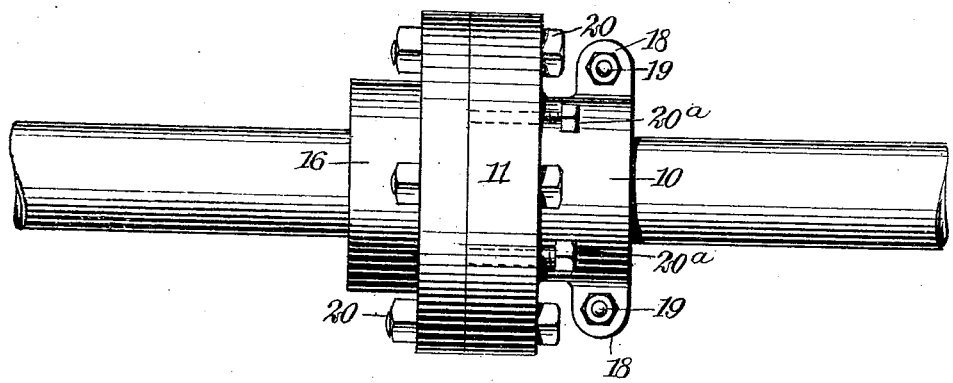
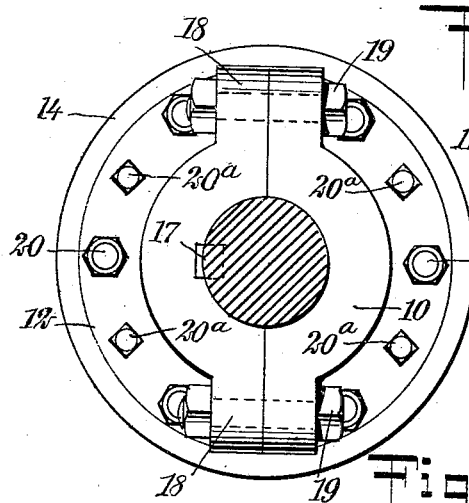
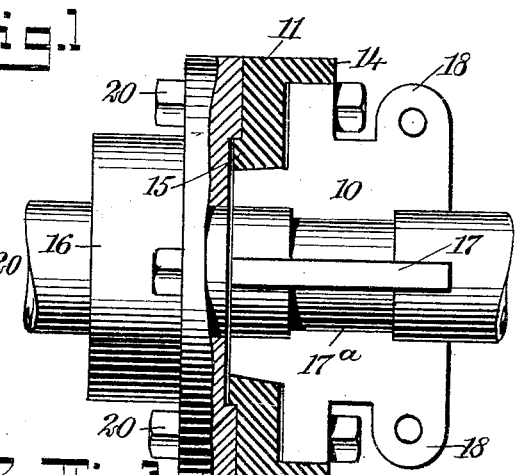
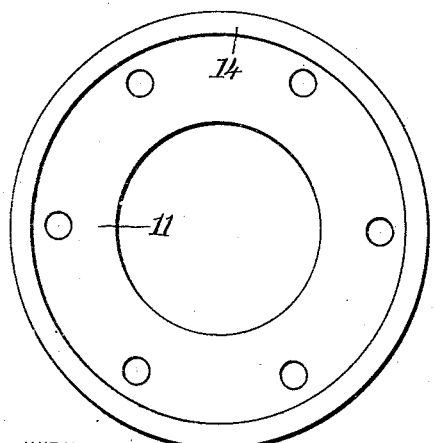
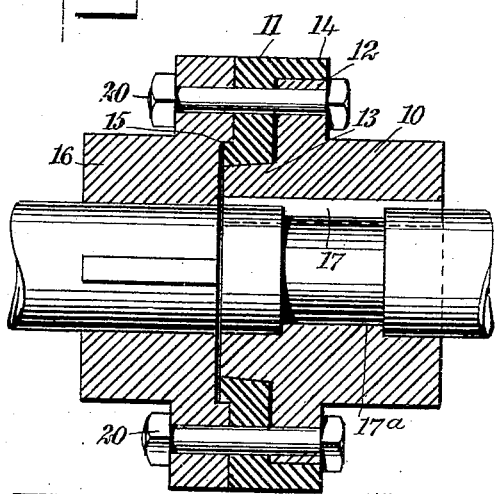
WITNESSES
INVENTOR
Frank B. Richardson
BY Munn & Co
ATTORNEYS

UNITED STATES PATENT OFFICE.

FRANK BYRON RICHARDSON, OF SLIDELL, LOUISIANA.

SHAFT-COUPLING.

939,744.  Specification of Letters Patent.  Patented Nov. 9, 1909.

Application filed January 9, 1908. Serial No. 409,926.

*To all whom it may concern:*

Be it known that I, FRANK B. RICHARDSON, a citizen of the United States, and a resident of Slidell, in the parish of St. Tammany and State of Louisiana, have invented a new and Improved Shaft-Coupling, of which the following is a full, clear, and exact description.

This invention is an improvement in couplings for connecting the opposed ends of two alining shafts, and has in view a device of this nature which, while joining the shafts together with the utmost security, may be easily stripped from one of the shafts and permit of the latter's withdrawal through a bearing or other constricted place. I accomplish this by constructing the coupling with a split collar and binding the two halves or portions thereof firmly together, when the coupling is assembled, by an intermediate ring.

Reference is to be had to the accompanying drawings forming a part of this specification, in which similar characters of reference indicate corresponding parts in all the views.

Figure 1 is a side elevation of a coupling embodying my invention as applied to two shafts; Fig. 2 is an end view of the coupling; Fig. 3 is a side elevation of the coupling partly in longitudinal central section; Fig. 4 is an end view of a ring forming a feature of the invention; and Fig. 5 is a longitudinal central section through the coupling at right-angles to the section shown in Fig. 3.

A coupling constructed in accordance with my invention essentially consists of a split collar 10 and a locking-ring 11. The collar 10 is preferably constructed with an external flange 12 and a tapering boss 13 arranged on its inner face; the latter being forcibly embraced when the coupling is assembled, by the ring 11. This ring, as will be observed in both Figs. 3 and 5, not only envelops the split collar around the boss, but also is provided with a laterally-projecting flange 14 on its outer face, which surrounds and closely fits the external flange 12 of the collar.

On the inner face of the locking-ring 11, a boss 15 is provided, which, in connection with the extended portion or boss 13 of the collar 10, is adapted to enter the recessed inner face of a continuous unbroken collar 16, the latter being keyed or otherwise suitably fixed to one section of the shaft, which the coupling is used to join. The split collar 10 receives the opposed section of the shaft to which it is splined by a key 17, and the bore thereof is of reduced diameter intermediate its length as indicated at $17^a$, which necessitates that the shaft be correspondingly turned to produce a neat fit. Ordinarily the bore of the split collar will be a fraction smaller than the diameter of the shaft, whereby when the halves of the collar are applied to the shaft and forced into abutting relation, the shaft will be firmly gripped. This gripping action of the collar sections is, in that form of my invention illustrated, not wholly dependent on the locking-ring 11, but each section or half of the collar has lugs or ears 18 extending at substantially diametrically opposite points therefrom, provided with transverse apertures, registering, when the collar is applied to the shaft, with the apertured ears in the opposed collar section. Through these apertures are passed closely-fitting bolts 19. Bolts 20 pass through alining openings in the flanges of the two collars and through the intermediate locking-ring and join the elements of the coupling together in a longitudinal direction. All of these bolts in practice have the slight standard taper, whereby they are adapted to be driven in place with the requisite tightness. The external diameter of the locking-ring, it will be observed, is the same as the diameter of the collar 16, which gives the coupling a smooth unbroken appearance when the parts are bolted together. In order that this ring may be easily removed when the coupling is to be disassembled, I provide the flange of the divided collar with set-screws $20^a$, which pass therethrough and bear directly on the ring. When these set-screws are tightened, after the bolts 20 have been removed, it is obvious that the locking-ring will be forced from the tapering boss of the collar sections, thereby permitting of these sections being readily stripped from the shaft on removing the transverse bolts 19.

The ease in which the coupling may be dismounted and removed from one of the shaft sections makes it of particular value in marine construction for joining the engine or driving-shaft to the stern or propeller shaft. When used in this relation, the split collar will ordinarily be applied to the propeller shaft, and when removed will permit of this shaft being drawn through the stern stuffing-box, or by or through other constricted places. The split collar when applied to the stern shaft will also by reason of the contracted portion 17ª of its bore, hold the shaft against end thrust.

Having thus described my invention, I claim as new and desire to secure by Letters Patent:

1. In a coupling, a continuous unbroken flanged collar, a split flanged collar separate from the first mentioned collar, a ring intermediate said collars binding the portions of the split collar together, and means passing through the flanges of the collars and through the ring joining them together.

2. In a coupling for joining together two sections of a shaft, a member made of separable sections and having a tapered boss, with a flange projecting outwardly from the enlarged end of the boss, a collar attached to one section of the shaft, a second member fitting over the tapered boss of the first member and locking the sections of the first member together and to the other section of the shaft and having a laterally-projecting flange fitting over the outwardly-projecting flange of the first member, and means passing through and joining the two members and collar together.

3. In a coupling, a collar and a split collar arranged end to end, a ring between the opposing ends of the two collars, locking the portions of the split collar together, and means joining the collars and ring.

4. In a coupling, a flanged collar, a flanged split collar having a tapered boss on its inner face, a locking-ring intermediate said collars and fitting over the boss of the split collar, and means passing through the flanges of the collars and through the locking-ring joining them together.

5. In a coupling, a flanged collar, a split flanged collar, a locking-ring intermediate said collars having a laterally-projecting flange fitting over the flange of the split collar and of substantially the same external diameter as the flange of the other collar, and means passing through the flanges of the collars and through said ring joining them together.

6. In a shaft coupling, a flanged collar, a second flanged collar made of separable sections, with the inner end of the second collar projecting beyond the flange thereof, and an intermediate locking ring fitting over the inner projecting end and the flange of the second collar, joining the sections thereof together.

In testimony whereof I have signed my name to this specification in the presence of two subscribing witnesses.

FRANK BYRON RICHARDSON.

Witnesses:
E. F. HAILEY,
J. A. SALMEN.